United States Patent
Okutani et al.

(10) Patent No.: US 11,526,637 B2
(45) Date of Patent: Dec. 13, 2022

(54) INFORMATION PROCESSING APPARATUS, INFORMATION PROCESSING METHOD, AND STORAGE MEDIUM FOR CREATING A THERMAL NETWORK MODEL IN A SHORT TIME

(71) Applicant: CANON KABUSHIKI KAISHA, Tokyo (JP)

(72) Inventors: Naoto Okutani, Yokohama (JP); Eiji Yajima, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 16/548,671

(22) Filed: Aug. 22, 2019

(65) Prior Publication Data
US 2020/0074022 A1    Mar. 5, 2020

(30) Foreign Application Priority Data

Aug. 31, 2018  (JP) .............................. JP2018-163443

(51) Int. Cl.
| | | |
|---|---|---|
| *G06F 30/18* | (2020.01) | |
| *G06F 3/0481* | (2022.01) | |
| *G06T 17/20* | (2006.01) | |
| *G06F 111/20* | (2020.01) | |
| *G06F 119/08* | (2020.01) | |

(52) U.S. Cl.
CPC ............ *G06F 30/18* (2020.01); *G06F 3/0481* (2013.01); *G06T 17/20* (2013.01); *G06F 2111/20* (2020.01); *G06F 2119/08* (2020.01)

(58) Field of Classification Search
CPC ...... G06F 2119/08; G06F 30/23; G06F 30/18; G06F 30/20; G06T 17/20
See application file for complete search history.

(56) References Cited

U.S. PATENT DOCUMENTS

| | | | | |
|---|---|---|---|---|
| 6,389,582 | B1 * | 5/2002 | Valainis | G06F 30/392 |
| | | | | 716/122 |
| 6,713,008 | B1 * | 3/2004 | Teeter | B29C 70/025 |
| | | | | 264/258 |
| 7,707,525 | B2 * | 4/2010 | Varon-Weinryb | G06F 30/23 |
| | | | | 716/136 |

(Continued)

FOREIGN PATENT DOCUMENTS

| | | |
|---|---|---|
| JP | 2002-230047 A | 8/2002 |
| JP | 2003-337836 A | 11/2003 |

(Continued)

*Primary Examiner* — Kibrom K Gebresilassie
(74) *Attorney, Agent, or Firm* — Canon U.S.A., Inc., IP Division

(57) ABSTRACT

An information processing apparatus includes a receiving unit configured to receive input of shape data of a device that is a subject of a thermal analysis, a selection unit configured to select a modeling method for a component included in the device, a generation unit configured to generate a thermal network model of the component from the shape data based on the selected modeling method, an addition unit configured to add a node and an element to the thermal network model, a setting unit configured to set a boundary condition to the thermal network model, a determination unit configured to determine a physical quantity of the thermal network model, and a display unit configured to display the determined physical quantity.

20 Claims, 13 Drawing Sheets

(56) References Cited

U.S. PATENT DOCUMENTS

| | | | |
|---|---|---|---|
| 8,201,113 B2* | 6/2012 | Pramono | G06F 30/367 |
| | | | 716/100 |
| 9,146,652 B1* | 9/2015 | Danielsson | G06F 3/048 |
| 9,384,315 B2* | 7/2016 | Monetti | G06F 30/392 |
| 10,549,453 B2* | 2/2020 | Tomiyama | B29C 48/402 |
| 2004/0073397 A1* | 4/2004 | Matsuyama | G06F 30/23 |
| | | | 702/136 |
| 2008/0246766 A1* | 10/2008 | Yokohari | G06T 17/20 |
| | | | 345/423 |
| 2009/0271156 A1* | 10/2009 | Kageura | G06F 30/23 |
| | | | 703/1 |
| 2011/0098987 A1* | 4/2011 | Isoshima | G06F 30/23 |
| | | | 703/1 |
| 2016/0132621 A1* | 5/2016 | Tomiyama | B29C 48/507 |
| | | | 703/2 |

FOREIGN PATENT DOCUMENTS

| | | |
|---|---|---|
| JP | 2006-059035 A | 3/2006 |
| JP | 3780361 B2 | 5/2006 |
| JP | 2015-146166 A | 8/2015 |

* cited by examiner

FIG.4

| COMPONENT MODELING METHOD SETTING UNIT | | | | |
|---|---|---|---|---|
| COMPONENT | MODELING METHOD (301) | STATUS (302) | (303) | (304) |
| Plate_Model | PLATE ▼ | DEFINED | CREATE | DELETE |
| Mold_Model | SOLID BLOCK ▼ | UNDEFINED | CREATE | DELETE |
| Pcb_Model | PLATE ▼ | UNDEFINED | CREATE | DELETE |
| ⋮ | ⋮ | ⋮ | ⋮ | ⋮ |

PLACE NODE AND ELEMENT ON SHEET BODY

PERFORM VORONOI PARTITION BASED ON DESIGNATED POINT

PERFORM REGION DIVISION AND UPDATE NODE AND ELEMENT

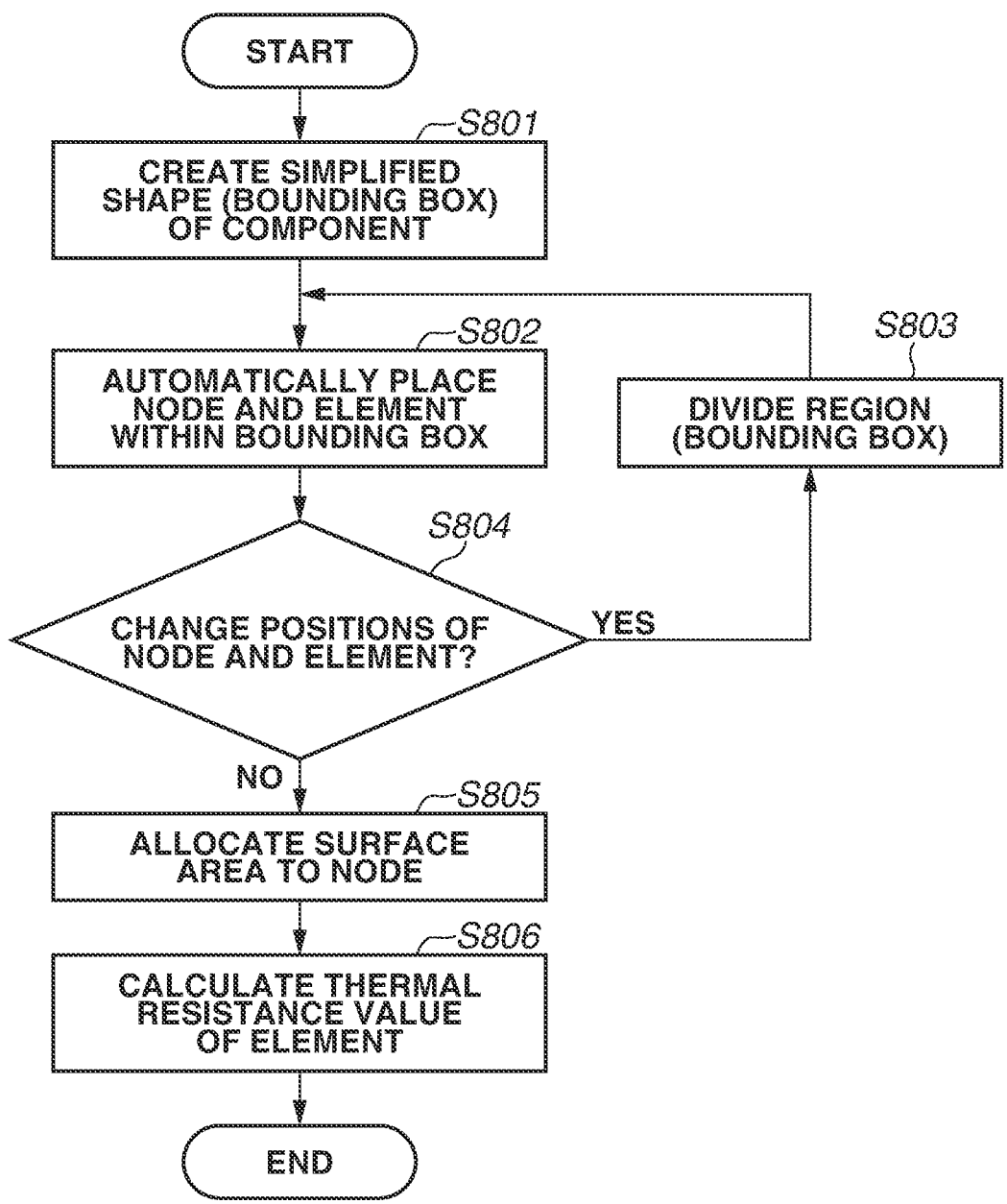

INFORMATION PROCESSING APPARATUS, INFORMATION PROCESSING METHOD, AND STORAGE MEDIUM FOR CREATING A THERMAL NETWORK MODEL IN A SHORT TIME

BACKGROUND OF THE INVENTION

Field of the Invention

The present disclosure relates to an information processing apparatus, an information processing method, and a storage medium.

Description of the Related Art

Computer aided design (CAD) has been widely used to design a component and a product. A three-dimensional model created by using CAD (hereinafter referred to as a "CAD model") is converted into a numerical analysis model (hereinafter referred to as an "analysis model") to perform a numerical analysis simulation, and a design detail is studied based on an analysis result obtained by the simulation.

With regard to heat, a thermal analysis in a design process has been indispensable due to downsizing and higher integration of an electronic device. One of calculation methods used for the thermal analysis is a thermal network method, which is widely known. The thermal network method divides an analysis object into relatively coarse regions, provides a node in each of the regions, calculates a thermal resistance between the nodes, and solves simultaneous equations in which a heat flow rate is a conserved quantity for each of the nodes. The thermal network method can provide a calculation result by small-scale calculation compared to a calculation method in which a detailed analysis is performed by dividing an analysis object into small regions, such as a finite volume method and a finite element method. The thermal network method is known to be effective in thermal study at an early stage of design by making use of the above-described advantage.

As a system using a thermal network method, Japanese Patent No. 3780361 discusses a technique for creating an analysis model of a thermal network (hereinafter referred to as a "thermal network model") from a CAD model.

However, in the above-described technique, there is an issue that it is necessary for an analyst to manually input dimensions of a device to calculate a thermal resistance value of a created analysis model, and thus it takes time to create the analysis model.

SUMMARY OF THE INVENTION

According to an aspect of the present disclosure, an information processing apparatus includes a receiving unit configured to receive input of shape data of a device that is a subject of a thermal analysis, a selection unit configured to select a modeling method for a component included in the device, a generation unit configured to generate a thermal network model of the component from the shape data based on the selected modeling method, an addition unit configured to add a node and an element to the thermal network model, a setting unit configured to set a boundary condition to the thermal network model, a determination unit configured to determine a physical quantity of the thermal network model, and a display unit configured to display the determined physical quantity.

Further features of the present disclosure will become apparent from the following description of exemplary embodiments with reference to the attached drawings.

BRIEF DESCRIPTION OF THE DRAWINGS

FIG. 4 is a diagram illustrating an example of a modeling method setting screen.

FIG. 9 is a flowchart illustrating an example of information processing of a solid block modeling method.

DESCRIPTION OF THE EMBODIMENTS

An exemplary embodiment of the present disclosure will be described below with reference to the drawings.

Figure 1:
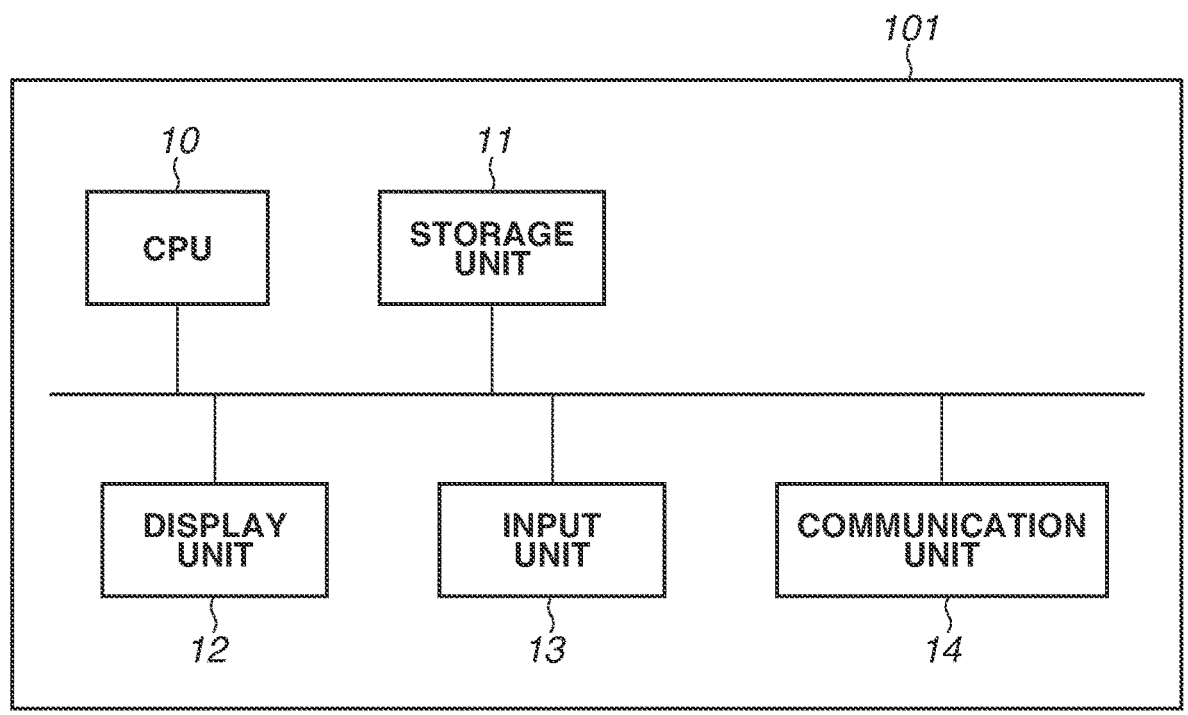
FIG. 1 is a block diagram illustrating an example of a hardware configuration of a thermal network analysis apparatus.

FIG. 1 is a block diagram illustrating an example of a hardware configuration of a thermal network analysis apparatus 101.

The thermal network analysis apparatus 101 includes a central processing unit (CPU) 10, a storage unit 11, a display unit 12, an input unit 13, and a communication unit 14, as a hardware configuration.

The CPU 10 controls the entire thermal network analysis apparatus 101. The CPU 10 executes processing based on a program stored in the storage unit 11 to implement a part of a functional configuration of the thermal network analysis apparatus 101 illustrated in FIG. 2, to be described below, and to implement processing of a flowchart in each of FIGS. 3, 5, and 9. The storage unit 11 stores the program and data to be used by the CPU 10 to execute the processing based on the program. The storage unit 11 also stores a material database 111 and an analysis model 112 that are to be described below. The display unit 12 displays various kinds of information. The input unit 13 receives a user operation via, for example, a keyboard, a mouse, and a screen displayed by the display unit 12. The display unit 12 and the input unit 13 may be integrated into one unit and provided as, for example, a touch panel display. The communication unit 14 connects the thermal network analysis apparatus 101 to a network and performs communication processing with an external apparatus via the network.

In another example, at least a part of the function or processing of the thermal network analysis apparatus 101 may be implemented by causing a plurality of CPUs and storage units to operate together. In another example, the function and the processing of the thermal network analysis apparatus 101 may be implemented by a plurality of devices operating together.

Figure 2:
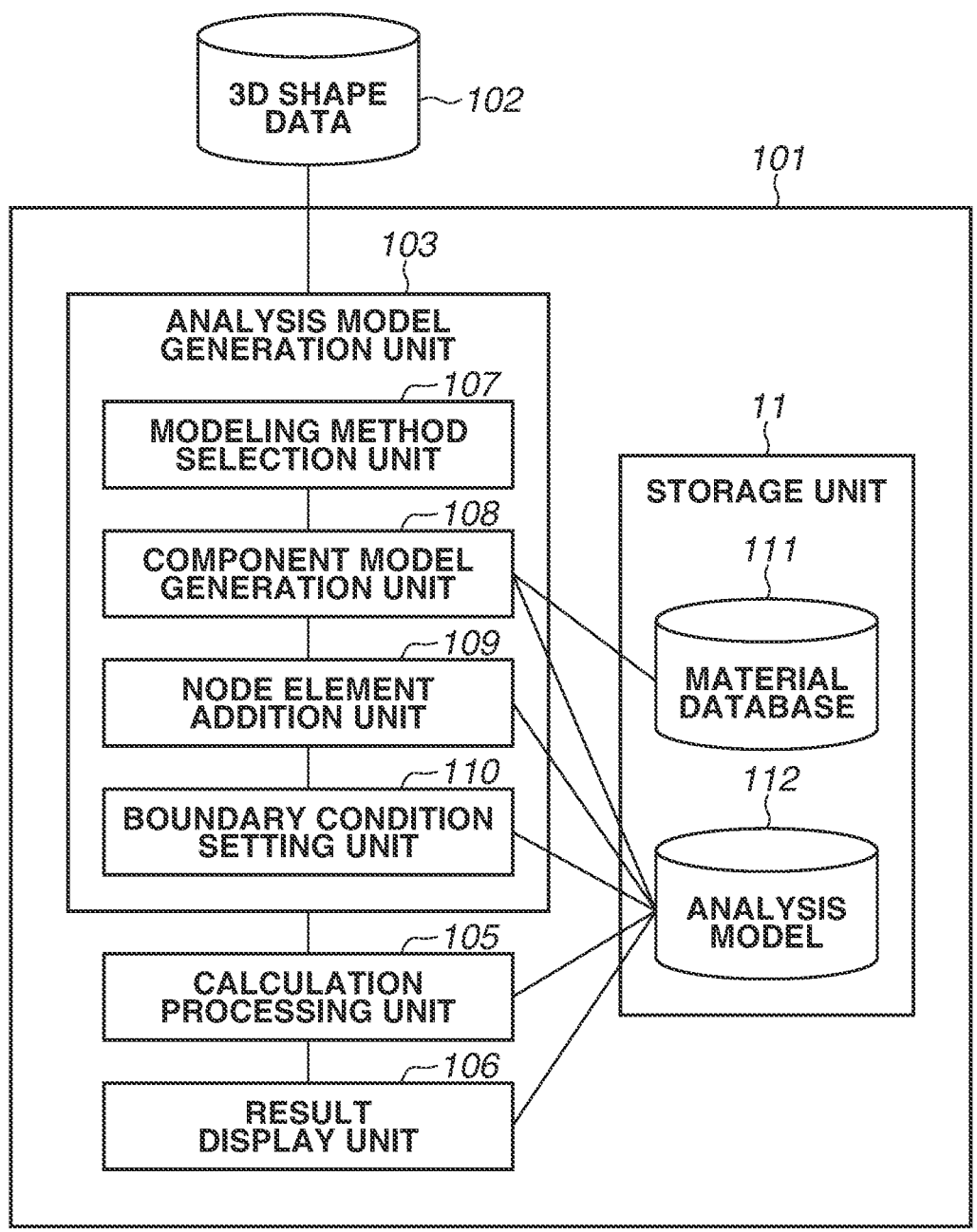
FIG. 2 is a block diagram illustrating an example of a functional configuration of the thermal network analysis apparatus.

FIG. 2 is a block diagram illustrating an example of the functional configuration of the thermal network analysis apparatus 101.

The thermal network analysis apparatus 101 includes an analysis model generation unit 103, a calculation processing unit 105, a result display unit 106, and the storage unit 11, as the functional configuration. Here, the analysis model generation unit 103, the calculation processing unit 105, and the result display unit 106 constitute a software configuration that is implemented by the CPU 10 executing the processing based on the program stored in the storage unit 11.

The analysis model generation unit 103 inputs three-dimensional (3D) shape data 102 of a device that includes a plurality of components and that is a subject of a thermal analysis. The 3D shape data 102 includes a shape model, attribute information of a model, and geometric information of a model.

The material database 111 includes a material and a physical property value of the material. The analysis model 112 includes information about an analysis model generated by the analysis model generation unit 103.

The analysis model generation unit 103 includes a modeling method selection unit 107, a component model generation unit 108, a node element addition unit 109, and a boundary condition setting unit 110. The component model generation unit 108 generates a thermal network model of a component (hereinafter referred to as a "component model"). The analysis model generation unit 103 inputs and outputs data to and from the storage unit 11 as appropriate and generates an analysis model from the input 3D shape data 102. The analysis model is used to perform calculation processing in the calculation processing unit 105. The modeling method selection unit 107 selects a modeling method for a subject component from among a plurality of modeling methods. The component model generation unit 108 generates a component model of the subject component by placing a node and an element on the 3D shape data using the modeling method selected by the modeling method selection unit 107. The node element addition unit 109 additionally generates a node and an element for the component model generated by the component model generation unit 108. The boundary condition setting unit 110 sets a boundary condition for the node.

In another example, at least a part of the analysis model generation unit 103, the calculation processing unit 105, and the result display unit 106 may be implemented by using a hardware circuit.

Figure 3:
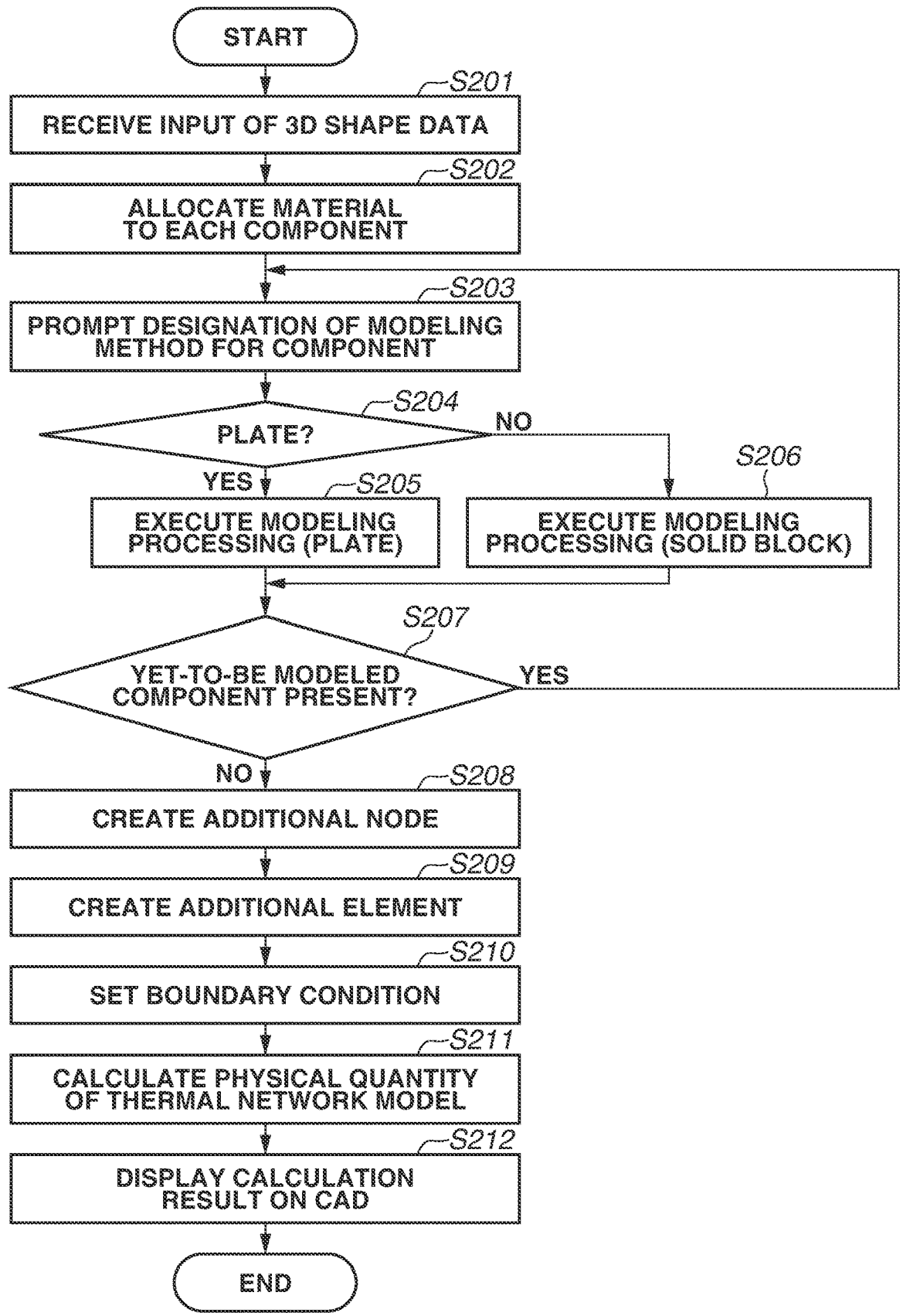
FIG. 3 is a flowchart illustrating an example of information processing of the thermal network analysis apparatus.

FIG. 3 is a flowchart illustrating an example of information processing of the thermal network analysis apparatus 101.

In step S201, the analysis model generation unit 103 inputs the 3D shape data 102 representing a device that is a subject of calculation. The process in step S201 is an example of processing for receiving input of the shape data.

In step S202, the analysis model generation unit 103 allocates a material to data that represents each component constituting the device and is obtained from the 3D shape data 102 input in step S201. The analysis model generation unit 103 acquires the material to be allocated from the material database 111 and allocates the acquired material to the data. The material may be registered in the material database 111 in advance. The analysis model generation unit 103 can also read a material file and add material data to the material database 111.

In step S203, the modeling method selection unit 107 displays a modeling method setting screen illustrated in FIG. 4 on the display unit 12 and prompts a user to designate a modeling method for the component.

FIG. 4 is a diagram illustrating an example of the modeling method setting screen.

The user operates the input unit 13 to select the modeling method in a selection area 301 of the modeling method setting screen and to select a model creation button 303.

In step S204, the modeling method selection unit 107 determines whether "plate" is selected as the modeling method based on the selection operation performed by the user on the modeling method setting screen. If the modeling method selection unit 107 determines that the plate is selected (YES in step S204), the processing proceeds to step S205. If the modeling method selection unit 107 determines that "solid block" is selected (NO in step S204), the processing proceeds to step S206.

Figure 5:
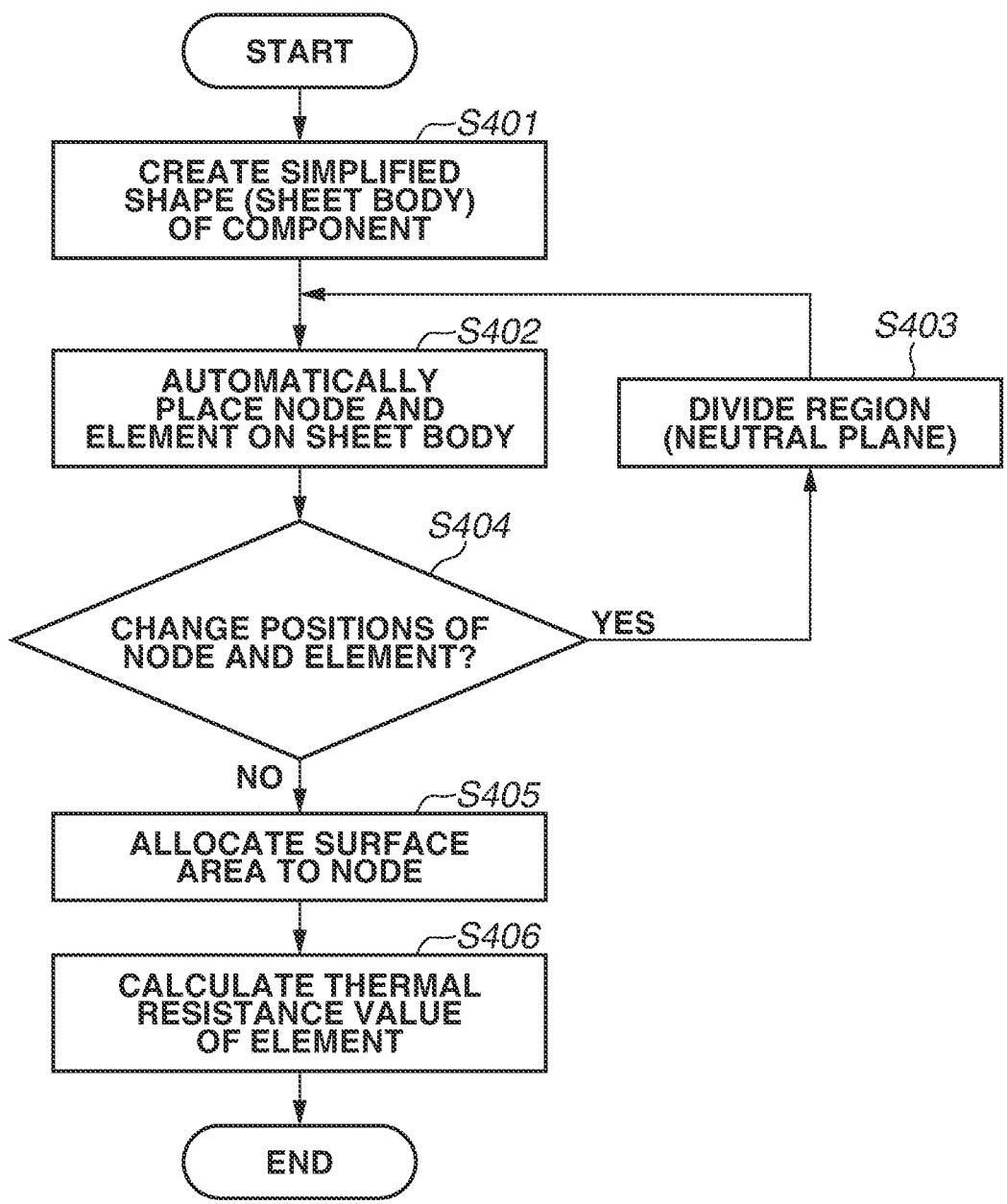
FIG. 5 is a flowchart illustrating an example of information processing of a plate modeling method.

In step S205, the component model generation unit 108 executes modeling processing (plate). Details of the modeling processing (plate) is illustrated in FIG. 5 to be described below.

In step S206, the component model generation unit 108 executes modeling processing (solid block). Details of the modeling processing (solid block) is illustrated in FIG. 9 to be described below.

Upon completion of creation of the model, a display area 302 indicating a status of modeling of the component changes to a defined status. To redo the creation of the model of the component, the user can delete the model by selecting a model deletion button 304 on the modeling method setting screen.

In step S207, the component model generation unit 108 determines whether a yet-to-be modeled component is present. If the yet-to-be modeled component is present (YES in step S207), the processing returns to step S203. If there is no yet-to-be modeled component (NO in step S207), the processing proceeds to step S208.

Here, the two modeling methods, the "plate" and the "solid block", will be described. FIG. 5 is a flowchart illustrating an example of information processing of the plate modeling method.

Figure 6:
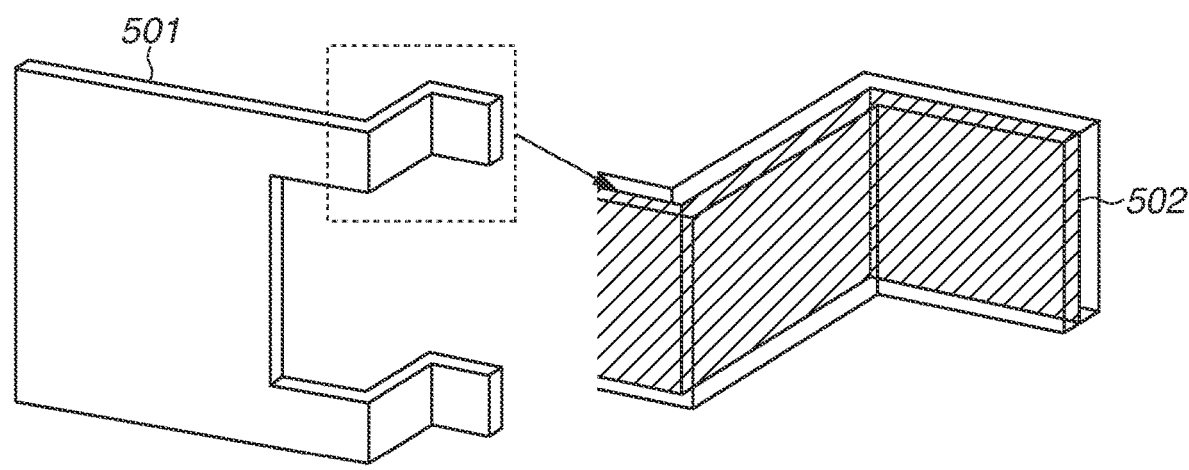
FIG. 6 is a diagram illustrating an example of processing for creating a simplified shape of a plate model.

In a case where the plate modeling method is designated, in step S401, the component model generation unit 108 creates a simplified shape (hereinafter referred to as a "sheet body") 502 expressed by a thin sheet from shape data 501 of a designated component, as illustrated in FIG. 6. In the present exemplary embodiment, the component model generation unit 108 creates a neutral surface of the shape data 501 of the component to be the sheet body 502. However, the method for creating the sheet body 502 is not limited to this example. For example, the component model generation unit 108 may create the sheet body 502 using a surface designated by the user.

Figure 7A:
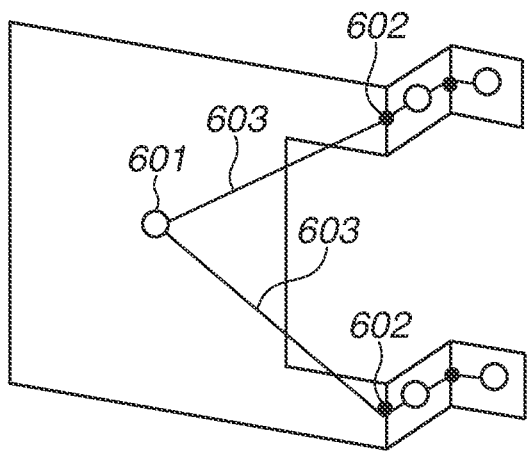
FIGS. 7A, 7B, and 7C are diagrams illustrating an example of processing for placing a node and an element on a plate model.

In step S402, the component model generation unit 108 automatically places a node and an element on the sheet body 502 as illustrated in FIG. 7A. The component model generation unit 108 places a first node 601 at a barycentric position of each surface of the sheet body 502, and stores the node and the surface in association with each other. The component model generation unit 108 places a second node 602 at a midpoint of a shared edge of the surfaces. Then, the component model generation unit 108 places an element 603 that connects the first node 601 and the second node 602 that are on the same surface.

In step S404, the component model generation unit 108 determines whether to change positions of the node and the element. If the component model generation unit 108 determines to change the positions of the node and the element (YES in step S404), the processing proceeds to step S403. If the component model generation unit 108 determines not to change the position of the node and the element (NO in step S404), the processing proceeds to step S405.

Figure 7B:
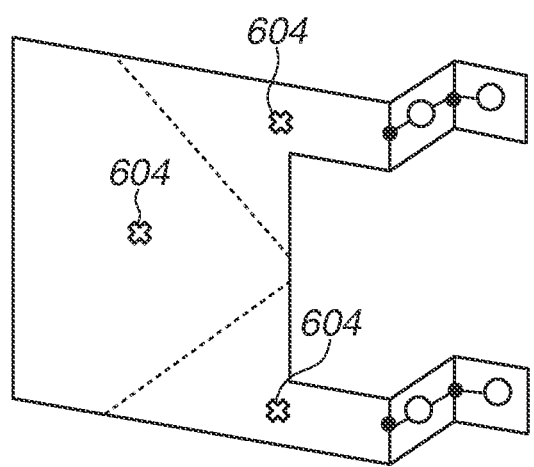
Figure 7C:
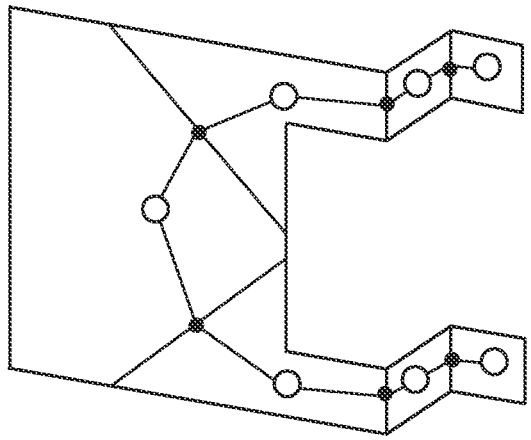

In step S403, the component model generation unit 108 divides the surface of the created sheet body 502 in response to an instruction from the user. The component model generation unit 108 may perform Voronoi partition based on a point 604 designated by the user as illustrated in FIG. 7B or may divide the surface based on a division plane designated by the user. After the surface division, the component model generation unit 108 performs the process in step S402 again. Then, the component model generation unit 108 deletes the node and the element placed before the surface division and places a node and an element again as illustrated in FIG. 7C. The process in step S403 is an example of region division processing in which a simplified shape of a component is divided into regions.

In step S405, the component model generation unit 108 allocates a surface area to the placed first node 601. The component model generation unit 108 allocates an area of the surface associated with the node 601. Here, by allocating the surface area to the first node 601, a value of the surface area can be automatically acquired when a radiation element and a convection element, to be described below, are created.

Figure 8A:
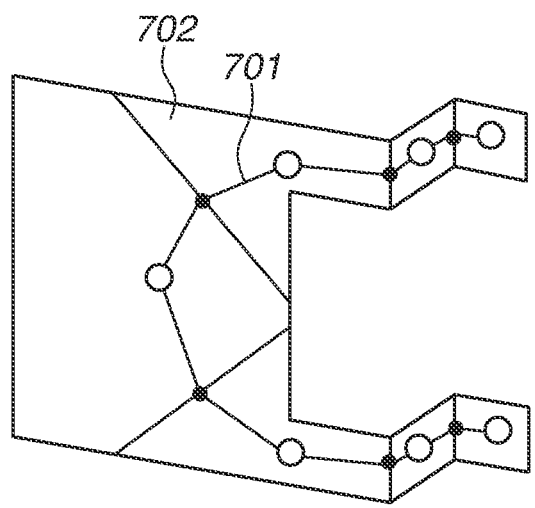
FIGS. 8A, 8B, and 8C are diagrams illustrating an example of thermal resistance calculation processing for an element connecting nodes.
Figure 8B:
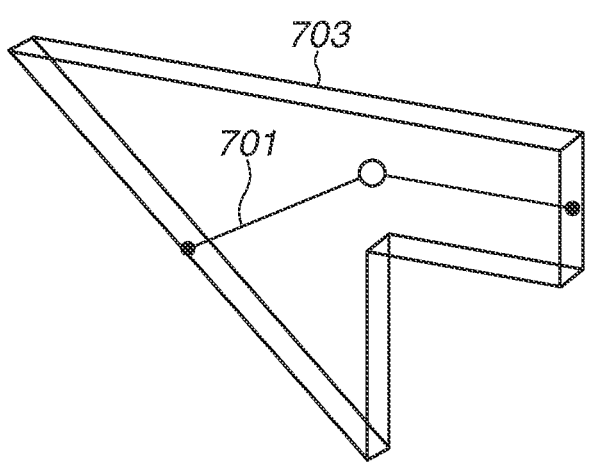
Figure 8C:
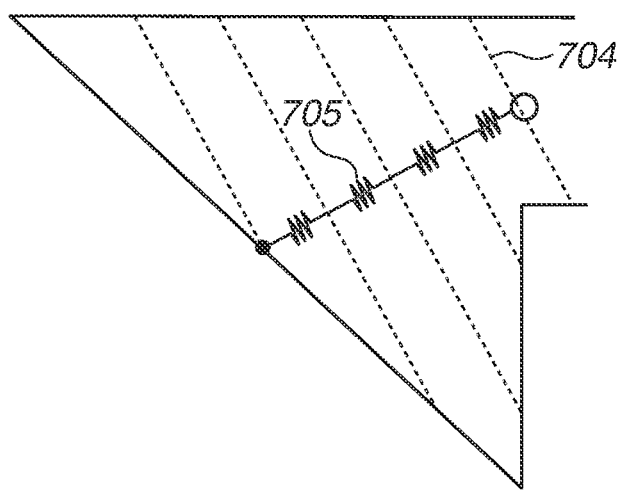

In step S406, the component model generation unit 108 calculates a thermal resistance value of the element connecting the nodes. In calculating the thermal resistance value, the component model generation unit 108 acquires a surface 702 of the sheet body 502 that is in proximity to an element 701, as illustrated in FIG. 8A. Then, the component model generation unit 108 acquires a shape 703 by offsetting the surface 702 in a direction of a normal line, as illustrated in FIG. 8B. Then, the component model generation unit 108 acquires a cross-sectional area of a cross section 704 orthogonal to the element 701, as illustrated in FIG. 8C. Then, the component model generation unit 108 calculates a thermal resistance 705 between the cross sections using the following expression.

$$R_k = \frac{L}{A\lambda} \quad (1)$$

Here, $R_k$ represents a thermal resistance, L represents a path length, A represents a cross-sectional area, and $\lambda$ represents a thermal conductivity of a subject component. The path length L represents a distance from a subject cross section to an adjacent cross section.

The component model generation unit 108 combines the calculated thermal resistances using the following expression, and calculates a thermal resistance of the element 701 connecting the nodes.

$$R = \sum_{k=1}^{n} R_k \quad (2)$$

As a result of the above processing, by using the plate modeling method, node placement along the shape can be easily performed, and the thermal resistance value can be automatically calculated from the shape data. Thus, a thermal network model of a plate-like component such as a metal sheet or a substrate can be created in a short time.

Figure 10A:
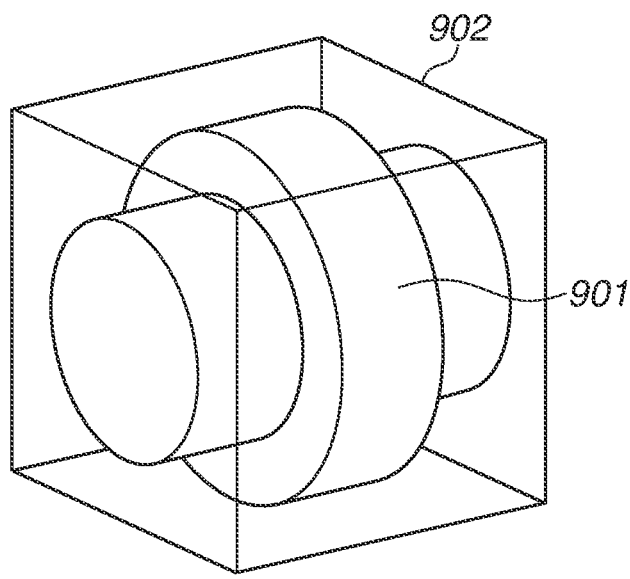
FIGS. 10A, 10B, 10C, and 10D are diagrams illustrating an example of processing for placing a node and an element on a solid block model.

FIG. 9 is a flowchart illustrating an example of information processing of the solid block modeling method. In a case where the solid block modeling method is designated, in step S801, the component model generation unit 108 creates a bounding box 902 including shape data 901 of a designated component as illustrated in FIG. 10A, and uses the created bounding box 902 as a simplified shape of the component.

Figure 10B:
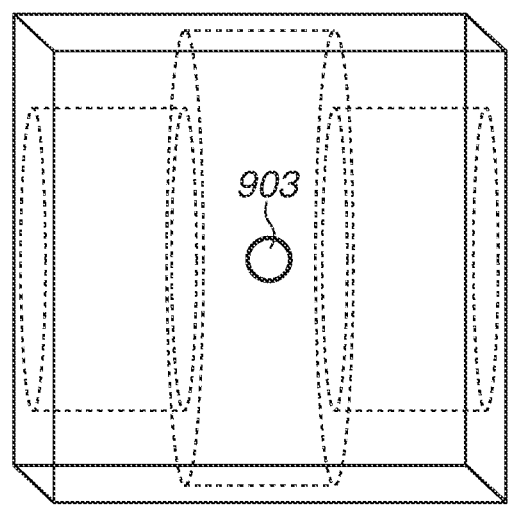

In step S802, the component model generation unit 108 places a first node 903 at a barycentric position of the bounding box 902 as illustrated in FIG. 10B.

Figure 10C:
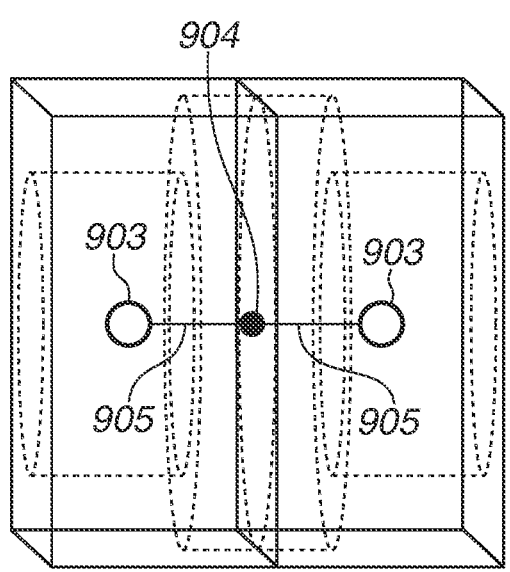

In a case where a bounding box is divided into a plurality of regions as illustrated in FIG. 10C, the component model generation unit 108 places a second node 904 at a barycentric position of a contact surface where bounding boxes resulting from division are in contact with each other. Then, the component model generation unit 108 places an element 905 that connects the first node 903 and the second node 904 on the surface of the bounding box that is the same as that of the first node 903.

In step S804, the component model generation unit 108 determines whether to change positions of the node and the element. If the component model generation unit 108 determines to change the positions of the node and the element (YES in step S804), the processing proceeds to step S803. If the component model generation unit 108 determines not to change the positions of the node and the element (NO in step S804), the processing proceeds to step S805.

Figure 10D:
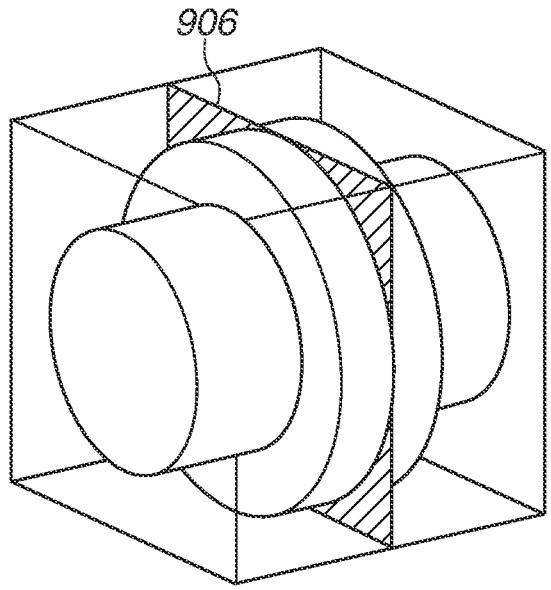

In step S803, the component model generation unit 108 divides the bounding box 902 and the shape data 901 of the component by a plane 906 designated by the user as illustrated in FIG. 10D. After the division, the component model generation unit 108 performs the process in step S802 again, and places the node and the element again.

In step S805, the component model generation unit 108 allocates a surface area corresponding to the placed first node 903. As for the surface area to be allocated, the component model generation unit 108 allocates a surface area of the shape data of the component included in the corresponding bounding box.

In step S806, the component model generation unit 108 calculates a thermal resistance value of the element connecting the nodes. Processing for calculating the thermal resistance value is similar to that of the thermal resistance value by the plate modeling method. The component model generation unit 108 acquires a cross-sectional area of a plane orthogonal to the element and calculates the thermal resistance value. The component model generation unit 108 acquires the cross-sectional area to be acquired from the shape data 901 of the component. As a result of the above processing, by using the solid block modeling method, the node is automatically placed on the subject component based on the simplified shape thereof, and the thermal resistance value is automatically calculated from the shape data of the component, so that the thermal network model can be created in a short time.

In the present exemplary embodiment, the plate modeling method and the solid block modeling method have been described, but the modeling method is not limited to these two methods. For example, in a case where a component having a hollow box shape is to be modeled, the component model generation unit 108 can create a bounding box and place a node and an element on a surface of the bounding box to create a thermal network model. Further, a modeling method can be added in which the component model generation unit 108 places a node and an element at arbitrary positions designated by the user and only a thermal resistance value is automatically calculated.

Referring back to FIG. 3, in step S208, the node element addition unit 109 adds a node to the thermal network model in response to an instruction from the user. The node element addition unit 109 creates an air node, and places the created air node on computer-aided design (CAD). A position of the node to be added may be determined beforehand so that the node element addition unit 109 can automatically place the node at the position, or the node element addition unit 109 can place the node at any position designated by the user.

In step S209, the node element addition unit 109 adds an element connecting the two nodes to the thermal network model in response to an instruction from the user. The node element addition unit 109 can create an element of a designated type between the two nodes.

Figure 11:
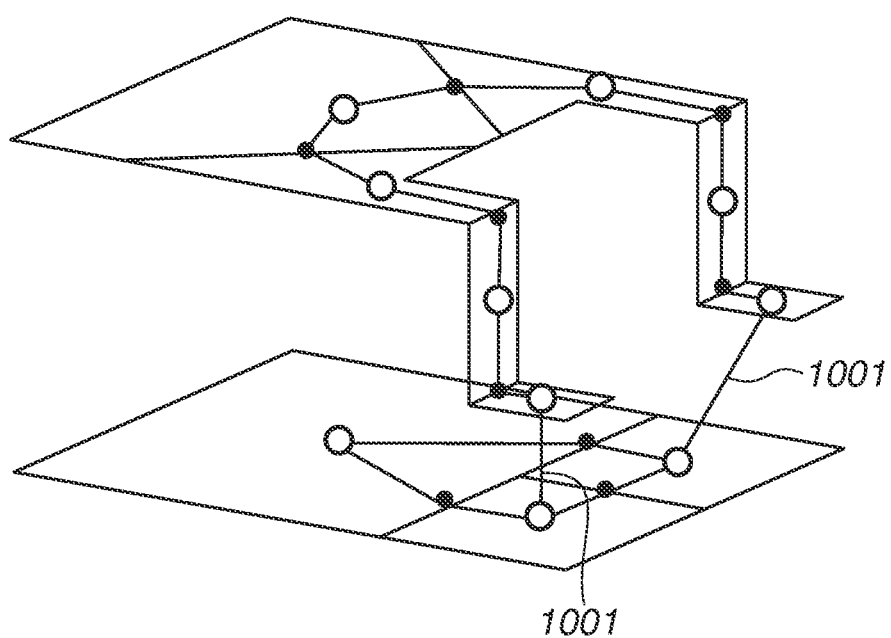
FIG. 11 is a diagram illustrating an example of creation of a contact element between components.

For example, in a case where an element representing contact between the components is to be created, two nodes are designated and a contact thermal resistance value is input. As a result, a contact element 1001 representing the contact between the components is created as illustrated in FIG. 11. Further, the node element addition unit 109 can acquire a contact position from a CAD model of the components, can automatically place a node at the contact position, and can connect the placed node with a node of a component located in proximity thereto to define the contact element.

Figure 12:
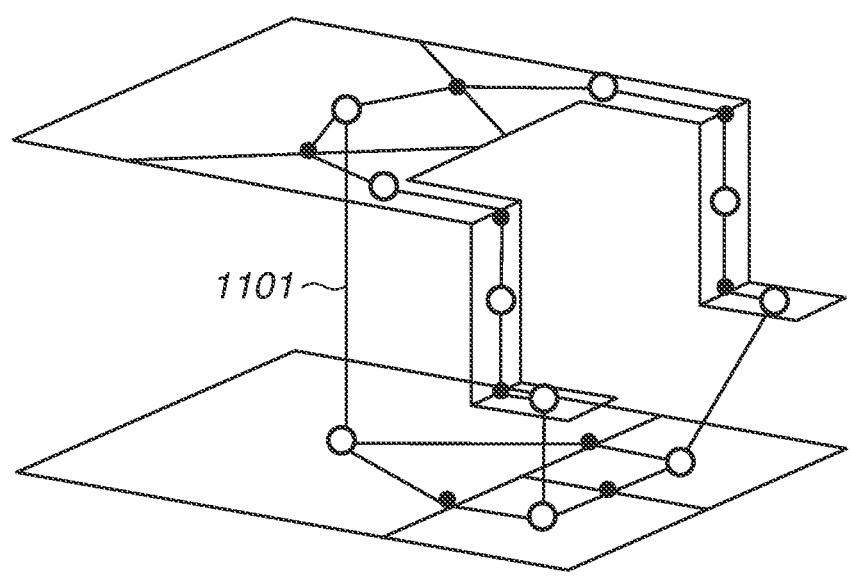
FIG. 12 is a diagram illustrating an example of creation of a radiation element between components.

In a case where an element representing radiation is to be created, two nodes are designated. Then, the node element addition unit 109 calculates conductance of radiation between the two nodes, and creates a radiation element 1101 as illustrated in FIG. 12.

Here, the node element addition unit 109 automatically sets the surface area allocated to the node to a surface area in radiation heat transfer. Further, the node element addition unit 109 calculates a form factor between the nodes from the shape data of a region corresponding to the node and sets the calculated form factor. The node element addition unit 109 may also set the surface area and the form factor in response to an instruction from the user.

Figure 13:
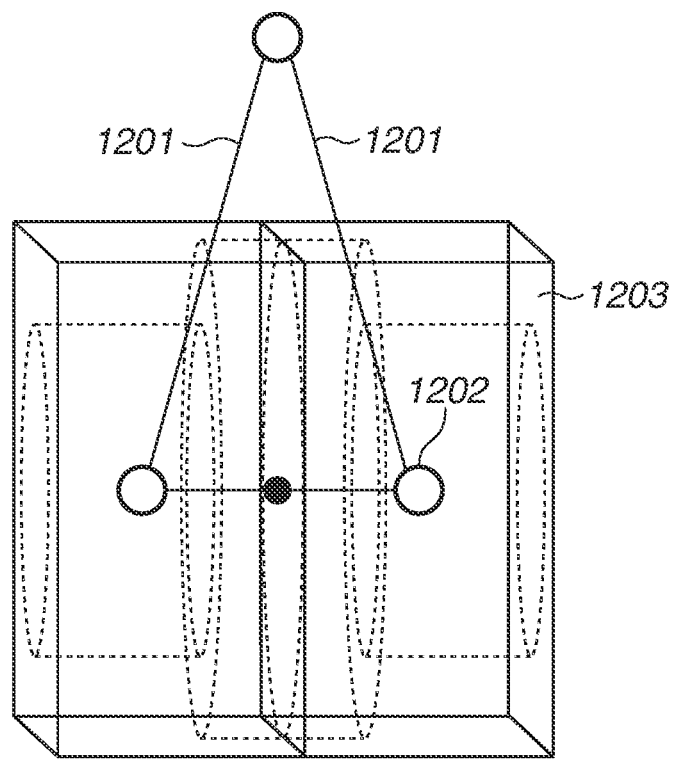
FIG. 13 is a diagram illustrating an example of creation of a convection element.

In a case where an element representing convection is to be created, a node of the component and an air node are designated. As a result, conductance of convection between the two nodes is calculated, and a convection element 1201 is created as illustrated in FIG. 13. Here, the node element addition unit 109 automatically sets the surface area allocated to the node to a surface area in convection heat transfer. The node element addition unit 109 calculates a representative length from dimensional information of a bounding box 1203, which includes shape data of a component associated with a first node 1202, as illustrated in FIG. 13, and sets the calculated representative length. The node element addition unit 109 may also set the surface area and the representative length in response to an instruction from the user.

In step S210, the boundary condition setting unit 110 sets a boundary condition to the thermal network model in response to an instruction from the user. Here, the boundary condition can be set to the node.

For example, in a case where a condition for heat generation is to be set, a node is designated, and a heat generation amount is input. Thus, the boundary condition for heat generation can be set.

In a case where a condition for temperature fixation is to be set, a node is designated, and a temperature is input. Thus, the boundary condition for temperature fixation can be set.

In step S211, the calculation processing unit 105 acquires information about the analysis model from the storage unit 11 and calculates a physical quantity of the thermal network model. The calculated physical quantity is recorded in the analysis model 112 of the storage unit 11. The process in step S211 is an example of processing for determining a physical quantity of a thermal network model.

In step S212, the result display unit 106 acquires information about the physical quantity of the analysis model from the storage unit 11, and displays the acquired physical quantity on the CAD.

For example, in a case where a temperature is to be displayed, the result display unit 106 can display the nodes on the CAD in contour form. The processing is an example of displaying nodes and 3D shape data of CAD associated with the nodes in the contour form. Further, since the node also holds information about the corresponding region, the result display unit 106 may also display the corresponding region in the contour form together with the node.

In a case where a heat flow rate between the nodes is to be displayed, the result display unit 106 can indicate the element between the nodes with an arrow to display a heat flow.

In the above-described processing, the shape data of a component is referred to, and an analysis model of a thermal network is created by a modeling method suitable for each component, so that manual input by a user is reduced and the analysis model can be created in a short time.

Other Exemplary Embodiments

The present disclosure can also be implemented by supplying a program that implements one or more functions of the above-described exemplary embodiment to a system or an apparatus via a network or a storage medium, and causing one or more processors in a computer of the system or the apparatus to execute processing by reading out the program. The present disclosure can also be implemented by a circuit (e.g., an application-specific integrated circuit (ASIC)) for implementing the one or more functions.

The exemplary embodiments of the present disclosure have been described above as examples, but the present invention is not limited to the specific exemplary embodiments.

According to each of the above-described exemplary embodiments, a thermal network model can be created in a shorter time.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-163443, filed Aug. 31, 2018, which is hereby incorporated by reference herein in its entirety.

What is claimed is:

1. An information processing apparatus comprising:
one or more memories storing instructions,
one or more processors coupled to the one or more memories,
wherein execution of the instructions cause the one or more processors to function as:
a receiving unit configured to receive input of three-dimensional shape data of a device that is a subject of a thermal analysis;
a selection unit configured to select a modeling method indicating an outline of a component included in the device based on a user instruction;
a generation unit configured to generate a thermal network model of the component by creating a neutral surface from the three-dimensional shape data and the selected modeling method and by placing a node and an element to the thermal network model based on the neutral surface;
a setting unit configured to set a boundary condition to the thermal network model;
a determination unit configured to determine a physical quantity of the thermal network model; and
a display unit configured to display the determined physical quantity.

2. The information processing apparatus according to claim 1, wherein the selection unit displays a screen for prompting designation of the modeling method for the component, and selects the modeling method designated via the screen as the modeling method for the component.

3. The information processing apparatus according to claim 1, wherein the generation unit creates a simplified shape of the component from the shape data based on the selected modeling method, divides the simplified shape into regions, places a node and an element on the regions of the simplified shape, and acquires a plurality of cross sections orthogonal to the element connecting the nodes from the shape data to obtain a thermal resistance.

4. The information processing apparatus according to claim 3, wherein the generation unit creates a simplified shape expressed by a thin sheet from the shape data as the simplified shape of the component in a case where the selected modeling method is a first modeling method.

5. The information processing apparatus according to claim 3, wherein the generation unit creates a bounding box including the shape data as the simplified shape of the component in a case where the selected modeling method is a second modeling method.

6. The information processing apparatus according to claim 3, wherein the generation unit performs Voronoi partition on the simplified shape based on a point designated by a user.

7. The information processing apparatus according to claim 3, wherein the generation unit divides the simplified shape based on a plane designated by the user.

8. The information processing apparatus according to claim 1, wherein the display unit displays the determined physical quantity in the shape data.

9. The information processing apparatus according to claim 1, wherein the physical quantity is a temperature within the thermal network model.

10. The information processing apparatus according to claim 1, wherein the physical quantity is a heat flow rate between the nodes.

11. An information processing method to be executed by an information processing apparatus, the information processing method comprising:
receiving input of three-dimensional shape data of a device that is a subject of a thermal analysis;
selecting a modeling method indicating an outline of a component included in the device based on a user instruction;
generating a thermal network model of the component by creating a neutral surface from the three-dimensional shape data and the selected modeling method and by placing a node and an element to the thermal network model based on the neutral surface;
setting a boundary condition to the thermal network model;
determining a physical quantity of the thermal network model; and
displaying the determined physical quantity.

12. The information processing method according to claim 11, wherein a screen for prompting designation of the modeling method for the component is displayed, and the modeling method designated via the screen is selected as the modeling method for the component in the selecting.

13. The information processing method according to claim 11, wherein a simplified shape of the component is created from the shape data based on the selected modeling method, the simplified shape is divided into regions, a node and an element are placed on the regions of the simplified shape, and a plurality of cross sections orthogonal to the element connecting the nodes is acquired from the shape data to obtain a thermal resistance in the generating.

14. The information processing method according to claim 13, wherein a simplified shape expressed by a thin sheet is created from the shape data as the simplified shape of the component in a case where the selected modeling method is a first modeling method in the generating.

15. The information processing method according to claim 13, wherein a bounding box including the shape data as the simplified shape of the component is created in a case where the selected modeling method is a second modeling method in the generating.

16. The information processing method according to claim 13, wherein Voronoi partition is performed on the simplified shape based on a point designated by a user in the generating.

17. The information processing method according to claim 13, wherein the simplified shape is divided based on a plane designated by the user in the generating.

18. The information processing method according to claim 11, wherein the determined physical quantity is displayed in the shape data in the displaying.

19. The information processing method according to claim 11, wherein the physical quantity is a heat flow rate between the nodes.

20. A non-transitory storage medium storing a program for causing a computer to execute a method, the method comprising:

receiving input of three-dimensional shape data of a device that is a subject of a thermal analysis;

selecting a modeling method indicating an outline of a component included in the device based on a user instruction;

generating a thermal network model of the component by creating a neutral surface from the three-dimensional shape data and the selected modeling method and by placing a node and an element to the thermal network model based on the neutral surface;

setting a boundary condition to the thermal network model;

determining a physical quantity of the thermal network model; and displaying the determined physical quantity.

* * * * *